(12) United States Patent
Chen et al.

(10) Patent No.: US 7,171,245 B2
(45) Date of Patent: Jan. 30, 2007

(54) METHOD FOR ELIMINATING MUSICAL TONE FROM BECOMING WIND SHEAR SOUND

(75) Inventors: Jian-Hueng Chen, Taoyuan (TW);
Cheng-Hsien Lin, Taoyuan (TW);
Gwo-Hwa Ju, Taoyuan (TW);
Shun-Fang Yang, Taoyuan (TW);
Jung-Kuei Chen, Taoyuan (TW);
Chung-Chieh Yang, Taoyuan (TW);
San-Wei Sun, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 289 days.

(21) Appl. No.: 10/839,167

(22) Filed: May 6, 2004

(65) Prior Publication Data

US 2005/0250554 A1      Nov. 10, 2005

(51) Int. Cl.
*H04B 1/38* (2006.01)
(52) U.S. Cl. .................... 455/570; 455/550.1
(58) Field of Classification Search ............. 455/570, 455/550.1, 569.1, 569.2, 218; 379/389, 406.01
See application file for complete search history.

(56) References Cited

U.S. PATENT DOCUMENTS

| | | | | |
|---|---|---|---|---|
| 5,014,343 A | * | 5/1991 | Place | 340/7.43 |
| 6,618,700 B1 | * | 9/2003 | Thyssen et al. | 704/230 |
| 6,633,841 B1 | * | 10/2003 | Thyssen et al. | 704/233 |
| 2004/0042540 A1 | * | 3/2004 | Stogner et al. | 375/219 |
| 2004/0189378 A1 | * | 9/2004 | Suzuki et al. | 330/52 |

* cited by examiner

*Primary Examiner*—Lester G. Kincaid
*Assistant Examiner*—Fred A. Casca
(74) *Attorney, Agent, or Firm*—Rabin & Berdo, P.C.

(57) ABSTRACT

The present invention provides a method for eliminating a musical tone from becoming a wind shear sound, which is used for the music recording file played in the GSM mobile communication system, such as the personal ring back tone. The method is to judge a portion of the music recording file where the music tone is erroneously judged as a background music, and add a small section of silence in front of the portion, so that the GSM mobile communication system would not judge the portion of the music tone as the background music so as to effectively eliminate the generation of the wind shear sound.

5 Claims, 2 Drawing Sheets

METHOD FOR ELIMINATING MUSICAL TONE FROM BECOMING WIND SHEAR SOUND

FIELD OF THE INVENTION

The present invention relates to a method for eliminating a musical tone from becoming a wind shear sound, and particularly to a method for effectively eliminating a musical tone from becoming a wind shear sound due to an erroneous judgment of a voice activity detection (VAD) algorithm for GSM mobile communication system when discontinuous transmission (DTX) function is turned on.

BACKGROUND OF THE INVENTION

The GSM mobile communication system is originally designed for the voice of human's speaking, but not for music transmission. But, the mobile added value service, especially the personal ring back tone, is vigorously developed in the recent years. Both the personal ring back tone and the song ordering system play music in the GSM mobile communication system. Based on the reason for reducing the electric wave interference, the GSM mobile communication system generally turns on the discontinuous transmission (DTX) function, so that when the input signal is judged as the background music, the base station transmits a silence descriptor (SID) data frame to the mobile phone at the beginning position of the background music, and then stops the data transmission until background music is over. In the meantime, the mobile phone generates a more comfortable noise to replace the original musical tone according to the SID data frame, so as to reduce the quantity of the transmitted data. However, the VAD algorithm of the GSM mobile communication system easily makes erroneous judgment for the music with slow change, so that when the mobile phone user receives the music, the musical tone becomes the wind shear sound, which is the noise generated by the GSM mobile communication system. Although the situation that the musical tone becomes the wind shear sound can be eliminated by turning off the DTX function, most telecommunication providers are unwilling to turn off the DTX function since it would increase the degree of the electric wave interference.

Therefore, the above prior art has many defects, so it is not a good design and should be improved.

Because of the above-described disadvantages generated from the prior art, the applicant keeps on carving unflaggingly to develop the method for eliminating a musical tone from becoming a wind shear sound of the present invention through wholehearted experience and research.

SUMMARY OF THE INVENTION

It is an object of the present invention to provide a method for effectively eliminating a musical tone from becoming a wind shear sound without changing the setting of the GSM mobile communication system.

It is another object of the present invention to provide a method for eliminating a musical tone from becoming a wind shear sound, which greatly increases the utility thereof.

The method for eliminating a musical tone from becoming a wind shear sound, which achieves the above invention objects, is used for the music recording file played in the GSM mobile communication system, such as the personal ring back tone. The method is to judge a portion of the music recording file where the music tone is erroneously judged as a background music, and add a small section of silence in front of the portion, so that the GSM mobile communication system would not judge the portion of the music tone as the background music so as to effectively eliminate the generation of the wind shear sound. The processing steps are as follows:

Step (A): judging the position where the GSM mobile communication system makes an erroneous judgment for the input music file according to the VAD algorithm of the GSM mobile communication system;

Step (B): searching forward from the position judged by Step (A) and inserting a small section of silence at a position where the amplitude of the original signal is lowest within a predetermined area to generate a new music file; and Step (C): using the music file generated in Step (B) as the input music file in Step (A) and repeating Step (A) and Step (B) until the input music file would not be erroneously judged as a background music by the VAD algorithm of the GSM mobile communication system.

For the music files that are digitally processed by the above steps, the situations that the musical tone becomes the wind shear sound are effectively eliminated.

These features and advantages of the present invention will be fully understood and appreciated from the following detailed description of the accompanying Drawings.

DETAILED DESCRIPTION OF THE PREFERRED EMBODIMENT

Figure 1:
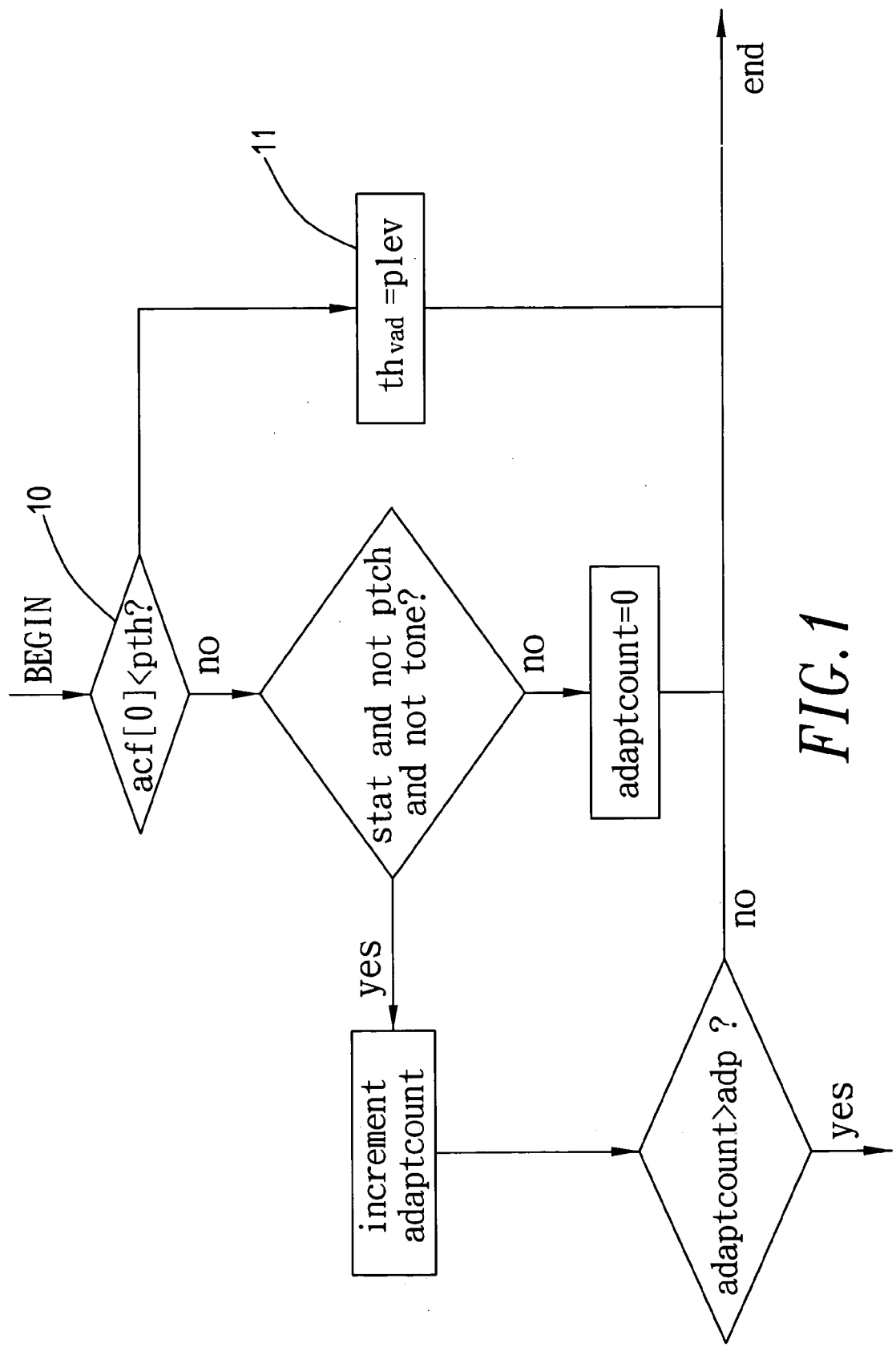
FIG. 1 shows the partial flowchart of thvad adjustment for the VAD algorithm.

The method provided by the present invention is to digitally process the music recording file in advance, so that the VAD algorithm of the GSM mobile communication system would not judge the musical tone as a background music. Therefore, it is necessary to understand the characteristics of the VAD algorithm. According to literature contents of European standard GSM 06.82 version 8.0.1 Release 1999, if the energy in the current filtered signal frame (pvad) is lower than an adaptive primary VAD threshold (thvad), the signal would be judged as a background music, in which the thvad is adjusted with the input signal, and the adjustment manner is referred to FIG. 1. FIG. 1 showing the partial flowchart of thvad adjustment for the VAD algorithm of the GSM standard in the method for eliminating a musical tone from becoming a wind shear sound provided by the present invention, which is a partial flowchart of thvad adjustment directly extracted from the page 12 of the literature. Please refer to the literature to understand the complete VAD algorithm. In FIG. 1, acf[0] (acf: the ACF vector which is calculated in the speech encoder) is the energy 10 of the input signal; when it is smaller than the energy threshold (pth), the thvad would be adjusted as a lower limit for adaptive threshold (plev) 11. According to this characteristic, if a small section of silence (signal energy equals to zero) or signal music whose energy is smaller than pth is added at a music file position before the position where GSM system makes an erroneous judgment, the signal music thereafter would not be erroneously judged as a background music, so that the musical tone can be eliminated from becoming a wind shear sound.

Adding a small section of silence or signal music whose energy is smaller than pth can eliminate the musical tone from becoming a wind shear sound, but if the insertion position is not carefully considered, it would cause the mobile phone user to hear a sound like slight jump. To reduce the influence of the extra-added signal music on the voice quality, the above-mentioned small section of silence or signal music whose energy is smaller than pth to be added is the shorter the better, but its length should be long enough, so that the VAD algorithm of the GSM system can at least get a signal of a music frame, and the energy of the music frame is smaller than pth. Also, the insertion position should be selected at a position where the amplitude of the original signal is lower. In addition, to reduce the insertion times of the added small section of silence or signal music whose energy is smaller than pth, the insertion is not performed at any position of the music recording file, but performed at a position a little in front of the position where the erroneous judgment of the music recording file in the GSM system is judged according to the VAD algorithm of the GSM system. Such procedures are repeated until the whole music recording system would not make any erroneous judgment at all.

Figure 2:
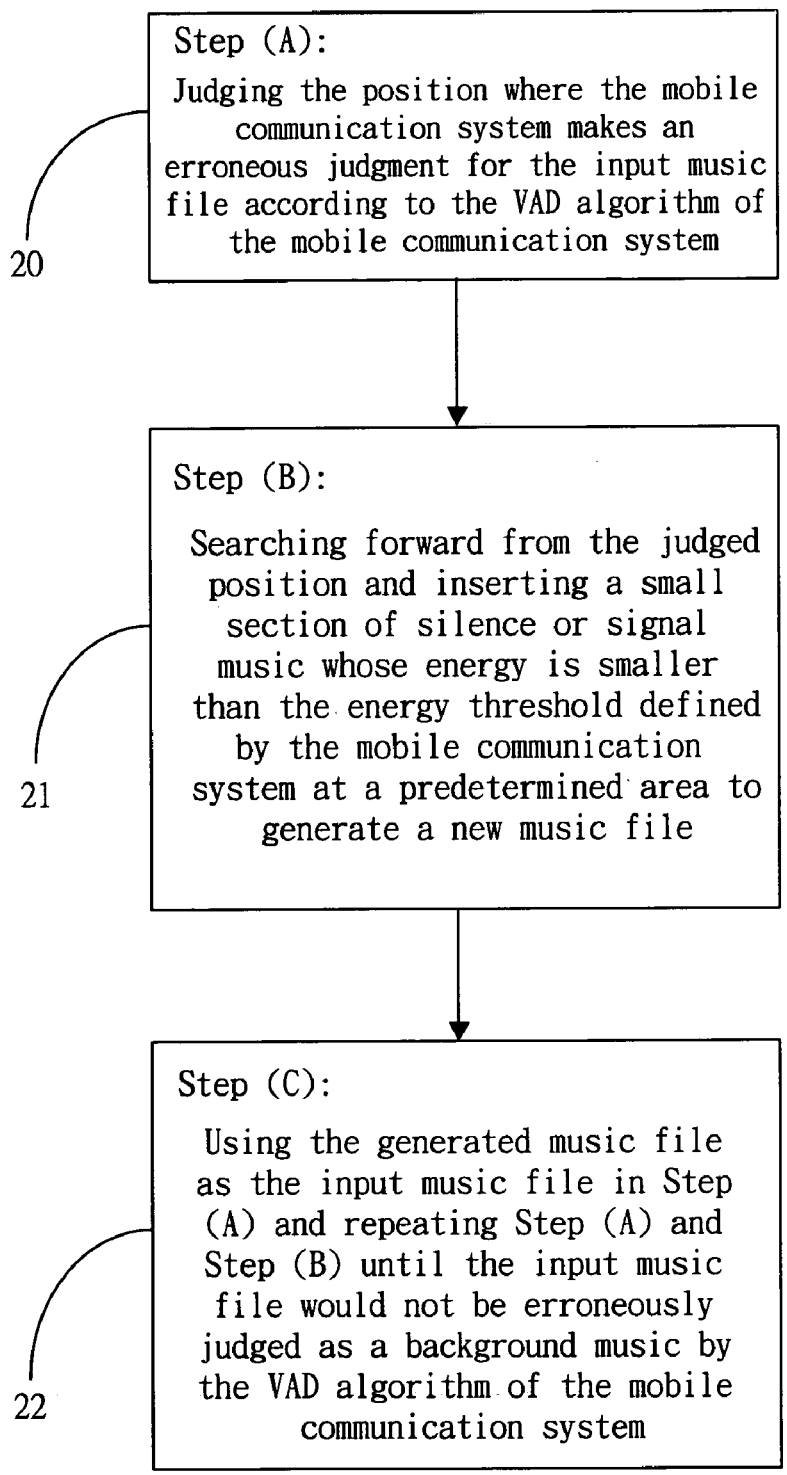
FIG. 2 shows a schematic view of the processing steps of the method for eliminating a musical tone from becoming a wind shear sound of the present invention.

Nowadays, many mobile communication companies provide the personal ring back tone, so that the original monotonous ring back tone can be changed to the users' favorite music or sound file recorded by themselves. But due to the erroneous judgment for the VAD algorithm of the GSM mobile communication system, the musical tone heard by the user end would become a wind shear sound, and the serious music may even not be accepted by the user. To solve this problem, the processing steps are as follows and referred to FIG. 2:

Step (A) 20: judging the position where the GSM mobile communication system makes an erroneous judgment for the input music file according to the VAD algorithm of the GSM mobile communication system;

Step (B) 21: searching forward from the position judged by Step (A) 20 and inserting a small section of silence at a position where the amplitude of the original signal is lowest within a predetermined area to generate a new music file; and Step (C) 22: using the music file generated in Step (B) 21 as the input music file in Step (A) and repeating Step (A) and Step (B) until the input music file would not be erroneously judged as a background music by the VAD algorithm of the GSM mobile communication system.

In which, the length of the added small section of silence has to be long enough, so that the voice activity detection (VAD) algorithm for the mobile communication system can at least get a signal of a music frame, and the energy of the music frame is smaller than the energy threshold defined by the mobile communication system. In the present embodiment, a length of 60 milliseconds is selected for the silence and a good result is obtained.

When the music files digitally processed by the above steps are actually tested on the communication system, more than 95% of the situations that the musical tone becomes the wind shear sound are effectively eliminated.

Compared to the prior art, the method for eliminating a musical tone from becoming a wind shear sound provided by the present invention has the following advantages:

1. The digital process for the signal of the present invention only processes the music recording file at the necessary position, and the influence on the sound quality is not significant for the sense of hearing, so as to effectively maintain the sound effect of the original music recording file.

2. The present invention can automatically process the application services for providing a great quantity or frequently changed music.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for keeping a musical tone from becoming a wind shear sound, comprising:
   adding a small section of silence or signal music whose energy is smaller than an energy threshold defined by a mobile communication system at a proper position of a music recording file, so that the mobile communication system will not erroneously judge a musical tone of the music recording file as being background music and thereby avoid a situation such that the musical tone becomes a wind shear sound,
   wherein the mobile communication system employs a VAD (voice activation detection) algorithm, and
   wherein adding a small section of silence or signal music whose energy is smaller than the energy threshold defined by the mobile communication system at a proper position comprises the steps of:
   (A) judging a position where the mobile communication system makes an erroneous judgment for an input music file according to the VAD algorithm of the mobile communication system;
   (B) searching forward from the position judged by step (A) and inserting a small section of silence at a position where the amplitude of an original signal is lowest within a predetermined area to generate a new music file; and
   (C) using the new music file generated in step (B) as the input music file in step (A) and repeating step (A) and step (B) until the input music file will not be erroneously judged as a background music by the VAD algorithm of the mobile communication system.

2. The method according to claim 1, wherein the added small section of silence or signal music whose energy is smaller than the energy threshold defined by the mobile communication system has a length that is long enough so that the VAD algorithm for the mobile communication system can at least get a signal of a music frame, and the energy of the music frame is smaller than the energy threshold defined by the mobile communication system.

3. A method for keeping a musical tone from becoming a wind shear sound, comprising:
   performing a signal treatment before broadcasting a music recording file from a mobile communication system so that the mobile communication system is able to avoid misjudging a music sound of the music recording file as background music resulting in the music sound becoming a wind shear sound;
   wherein the mobile communication system employs a VAD (voice activation detection) algorithm, and
   wherein the signal treatment comprises adding a small section of silence or signal sound whose energy is smaller than an energy threshold value defined by the mobile communication system ahead of each position of said music recording file where misjudgment might possibly happen,
   wherein the adding a small section of silence or signal sound comprises judging a position where the mobile communication system makes an erroneous judgment for an input music file according to the VAD algorithm of the mobile communication system.

4. A method for keeping a musical tone from becoming a wind shear sound, comprising:

performing a signal treatment before broadcasting a music recording file from a mobile communication system so that the mobile communication system is able to avoid misjudging a music sound of the music recording file as background music resulting in the music sound becoming a wind shear sound, wherein the signal treatment comprises adding a small section of silence or signal sound whose energy is smaller than an energy threshold value defined by the mobile communication system ahead of each position of said music recording file where misjudgement might possibly happen, wherein the mobile communication system employs a VAD algorithm, and wherein selecting an appropriate position to add a small section of silence or signal sound whose energy is smaller than the energy threshold value defined by the mobile communication system comprises the steps:

(A) judging a position where the mobile communication system makes a misjudgement for an input music file according to the VAD algorithm of the mobile communication system;

(B) searching forward from the position judged by step (A) and inserting a small section of silence or signal sound whose energy is smaller than the energy threshold value defined by the mobile communication system at a position where the amplitude of an original signal is lowest within a predetermined area to generate a new music file; and (C) using said new music file generated in step (B) to feed back as the input music file to step (A), and repeating step (A) and step (B) until the input music file will not be misjudged as a background music by the VAD algorithm of the mobile communication system.

5. The method according to claim 4, wherein the added small section of silence or signal sound whose energy is smaller than the energy threshold value defined by the mobile communication system has a length that is long enough so that the VAD algorithm for the mobile communication system can at least get a signal of a music frame, and the energy of said music frame is smaller than that of the threshold value defined by the mobile communication system.

* * * * *